United States Patent [19]

Gallizia et al.

[11] 4,088,523
[45] May 9, 1978

[54] PROCESS FOR INJECTION MOLDING A TIRE HAVING A CROWN AND SIDEWALLS OF DIFFERENT COMPOSITIONS

[75] Inventors: Achille Gallizia, Milan; Giorgio Tangorra, Monza (Milan), both of Italy

[73] Assignee: Industrie Pirelli S.p.A., Milan, Italy

[21] Appl. No.: 596,409

[22] Filed: Jul. 16, 1975

[30] Foreign Application Priority Data

Jul. 19, 1974 Italy ............................ 25356 A/74

[51] Int. Cl.² .................. B29H 5/00; B29H 17/02
[52] U.S. Cl. .................. 156/125; 264/271; 264/275; 264/326; 425/120; 425/130
[58] Field of Search .............. 156/123, 124, 125; 264/239, 271, 275, 326, 251, 254, 255, 259; 425/130, 134, 120; 249/105

[56] References Cited

U.S. PATENT DOCUMENTS

| | | | |
|---|---|---|---|
| 2,724,425 | 11/1955 | Ostling | 156/123 |
| 3,247,550 | 4/1966 | Haines | 264/175 |
| 3,381,736 | 5/1968 | Ford et al. | 264/275 |
| 3,458,373 | 7/1969 | Knipp et al. | 156/125 |
| 3,805,868 | 4/1974 | Tangorra | 152/355 |
| 3,837,986 | 9/1974 | Gorter et al. | 156/125 |

Primary Examiner—David Klein
Assistant Examiner—John E. Kittle
Attorney, Agent, or Firm—Stevens, Davis, Miller & Mosher

[57] ABSTRACT

A process for injection molding a crown of a vehicle tire from one composition and the sidewalls from a different composition involves the steps of shaping the reinforcing structure in the mold, injecting a first composition over one side of the reinforcing structure to form a crown with a tread and injecting a second composition to form the sidewalls with an interface within the proximity of the edges of the reinforcing structure. In a preferred embodiment, the tire has the configuration of the one disclosed in U.S. Pat. No. 3,805,868. The annular reinforcing structure is shaped to be generally convex but concave towards the tread along its edges.

15 Claims, 9 Drawing Figures

PROCESS FOR INJECTION MOLDING A TIRE HAVING A CROWN AND SIDEWALLS OF DIFFERENT COMPOSITIONS

This invention relates to a process for making pneumatic tires of the "cap and base" type, namely tires in which, in order to obtain optimum resistance to wear, to bending and to the other stresses to which the tire is selectively subjected in its various parts, the tread band and the sidewalls are made from different compounds.

A tire of this type can also be defined as a "tire comprising different compounds" and will be referred to in this way in the present application.

The tread and sidewalls are both based on natural or synthetic rubber, the latter being in general of the conventional GRS type or of the type obtained from the polymerization of diolefines and contain various fillers and additives of other kinds so it is not necessary to repeat a detailed description thereof. If necessary, the compounds can also contain uniformly distributed reinforcing material, such as glass fibers and the like.

Tires of this type are in general produced with largely manual manufacturing systems, followed by molding processes to impart to them the desired shape, both as regards their profile and as regards the outer configuration of the tread. These processes are complicated and expensive, but no entirely acceptable alternative process has been available up to this time.

Many alternatives have been suggested but none of the proposed techniques has been entirely successful. For example, various types of pouring and molding including injection molding have been considered. However, in spite of the economical advantage of such processes, a practical embodiment has not been available for commercial acceptance. The difficulties involved in the manufacture of tires from different compounds has convinced the technicians that the quality of the tire is sacrificed. This is particularly true when materials other than natural or synthetic rubbers, such as plastic or elastomeric materials of the polyurethane type are used. The physical characteristics of plastics and elastomers are inadequate even when a single compound is used for both the tread and sidewalls or when the conventional textile or metal reinforcements are eliminated.

It is therefore an object of the present invention to solve all of these problems and to provide a process for injection molding vehicle tires from different compounds and containing textile and/or metallic reinforcements in a uniform manner with short processing times and relevant economy. It is also an object of the invention to provide a process which is better from the standpoint of rapidity and economics than those which have been previously proposed and found to be impractical because of the complexity of the process or the poor quality of the product.

Other objects will become apparent from the following description with reference to the accompanying drawing wherein FIGS. 1 and 2 illustrate in cross-section an embodiment of the preferred type of tire;

The process provided by the present invention has been developed in particular to obtain a special type of tubeless tire of the kind disclosed in Italian Pat. No. 928,502 and U.S. Pat. No. 3,805,868. Hence, the invention will be described with reference to this particular type of tire but it is to be understood that it can be used for other types of tires and all types of pneumatic tires are contemplated. However, tires of the configuration disclosed in U.S. Pat. No. 3,805,868 are preferred.

Figure 1:
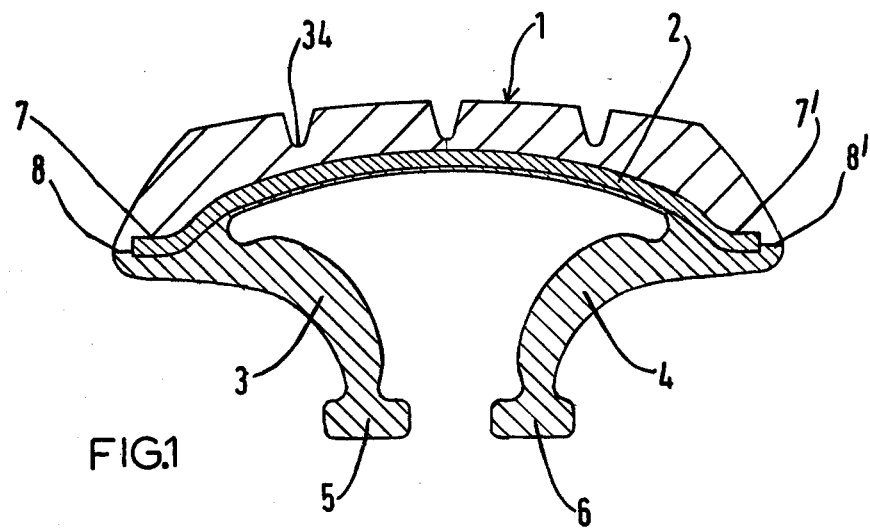

With reference to FIG. 1, a tire of the preferred type comprises a tread generically indicated with 1, containing an annular reinforcing structure 2 made of textile or metallic material, sidewalls 3 and 4 not containing a separate reinforcement. Sidewalls 3 and 4 are shaped, as indicated in FIG. 1, with a section of greater thickness in the central portion and convex towards the inside of the tire. Sidewalls 3 and 4 terminate in beads 5 and 6, which may be provided with bead cores, although the latter have not been shown in FIG. 1.

In the illustrated embodiment, which of course is not restrictive because tires of this type can be built up in many alternative embodiments, the reinforcing structure 2 is shaped at its ends so as to be concave towards the outside of the tire. Reinforcing structure 2 is provided with a convexity in its central part in order to define two end portions 7-7' which extend axially outwardly with respect to the inner cavity of the tire and as far as in proximity of the outer end of the tread. In FIG. 1, the two compounds of the tread and of the sidewalls have been indicated with different types of hatching, and it can be seen that such compounds are separated by means of the annular reinforcing structure. In the small zones existing between the ends of the structure and the outer ends of the tire, they join into interfaces 8-8' which can be considered as the ideal prolongation of the reinforcing structure. Obviously, any line indicated in FIG. 1 is transformed, in the space configuration of the tire, into a surface of rotation having the line as directrix and the axis of the tire as its own axis.

Figure 2:
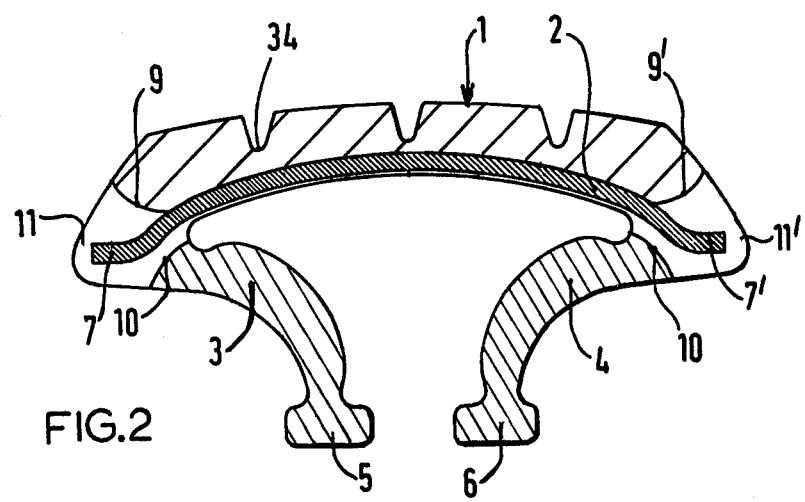

FIG. 2 illustrates a possible alternative embodiment of the tire of FIG. 1. The configuration of the annular reinforcing structure 2 in this embodiment remains unchanged. However, the interfaces of union between the two compounds are not situated in the ideal prolongation of the reinforcing structure, but can take different positions, above and below reinforcing structure 2 to form separation surfaces whose limits are respectively indicated with 9-9' and 10-10'. For purposes of illustration, the parts 11-11' of the tire, between surfaces 9 and 10 respectively and surfaces 9' and 10' have not been hatched in FIG. 2 since they, in possible alternative embodiments, can be constituted by the tread compound or by the sidewalls compound.

Bead cores, if desired, may be prepared by conventional methods, together with the annular reinforcing structure, which has preferably the shape illustrated in FIGS. 1 or 2, but which can also have any other appropriate shape.

The annular reinforcing structure 2 comprises a true reinforcing portion, made of textile or metallic material and an elastomeric portion situated on its inner face and intended to form the annular outer part of the inner surface of the tire cavity, except at its extremities where it is joined to the composition of the sidewalls. Reinforcing structure 2 may have a more complex construction. For example, it may have several layers of reinforcing textile or metallic material instead of one and may have, besides the single elastomeric covering layer, an additional layer situated on its opposite face.

Preferably, the annular reinforcing structure 2 is formed and treated in such a way as to possess a certain geometrical stability and to provide at the same time means for firmly joining it with the compounds of the sidewalls and of the tread.

For this purpose, it is desirable that, in the annular structure to be injection molded, the elastomeric material containing the reinforcing elements be substantially completely cured, giving therefore a certain dimensional stability to the unit. The outer elastomeric layers, on the other hand, should be only partially cured in order to facilitate their joining with the compounds of the sidewalls and of the tread in the final curing phase of the unit.

The means for obtaining this is known to the technician of this field, and may involve selecting appropriate formulae of the respective elastomeric compositions, or varying the amount of curing accelerators or retarders, and then in subjecting the unit to a curing process under such conditions of temperature and time that partial curing of the composition of the outer layers and substantially complete curing of the composition containing the textile or metallic layers are obtained.

Alternatively, an annular reinforcing structure can be provided, in which all the elastomeric material is completely cured, and then an adhesive agent is applied in any suitable manner on the outer surfaces of the structure.

No particular indication is given about the formation or the shape of the reinforcing layers, because these structures are known in the art and on the other hand the invention does not concern the particular formation of the annular reinforcing structure or of other possible reinforcing elements.

The so prepared annular reinforcing structure is introduced to a mold which comprises a core whose outer shape will define the shape of the inner cavity of the tire, and a female element intended to produce the desired outer profile of the tread, sidewalls and beads. The female element is often called "mold" in the art, but for the sake of clearness the word "mold" used in the present description will indicate both the core and the female element. The core is generally of the split type and is made of a material having a rigidity sufficient to insure perfect injection molding of a tire of this kind and to solve other problems regarding the tire removal, as will be indicated hereinafter. The annular reinforcing structure 2 is to be supported on one face by solid surfaces of the mold along at least a significant portion of its development. The bead cores are arranged in any known manner in the bead zone.

Preferably, the annular reinforcing structure 2 is mounted on the core in such a way as to be under circumferential tension, and this is obtained by appropriately sizing the structure.

The outer surface of the core can be worked, for instance, scored, to avoid possible displacement of the reinforcing structure from its pre-established position.

After the mold is closed, the two compounds of the sidewalls and of the crown, respectively, are admitted into it under an appropriate pressure and through suitable admission openings, in such a way that they flow the one towards the other at least in the zone where they shall have to come into respective contact. The compounds are volumetrically dosed in such a way to determine the position of the separation surface between them. The preparation and the plasticization of the compounds and the means for subjecting them to pressure and introducing them into the mold are generally known in the art and do not require any description. Other explanations on this phase of the process will be given below.

It is to be noted that the process consists of one phase, namely in its most typical and evident embodiment, the injection of the two compounds is simultaneous and they proceed contemporaneously towards the surface intended to separate them. This does not mean that in practice it is impossible to depart from this requisite of simultaneousness, in the meaning that it can be preferable to carry out the injection of one compound partially or totally before the injection of the other. It is however understood that this does not modify the nature of the process, which remains, from a conceptual point of view, a single-phase process.

The points of injection of the compounds must be such as to produce the flow in the above indicated desired meaning, and therefore they admit a common symmetry with the separation surface of the two compounds. This will be better explained below, but it can be noted that if the points of injection are distributed on surfaces symmetrical with respect to the median plane of the tire or contained in it and such that each area of the injection surface on one side of the plane has an equal and corresponding area on the other side of the same, the conditions of symmetry are respected.

After injection, the unit is preferably cured in the same mold in a conventional manner, and then the mold is opened and the core is removed from the molded tire.

In all the molding processes comprising the use of a rigid core in a tire structure, "undercut" problems are to be faced. These problems can be solved by an appropriate division of the core into segments, which can be carried out in various ways. The core described hereinafter constitutes only a possible example.

The invention will be better understood from the embodiments illustrated in FIGS. 3 to 8.

Figure 3:
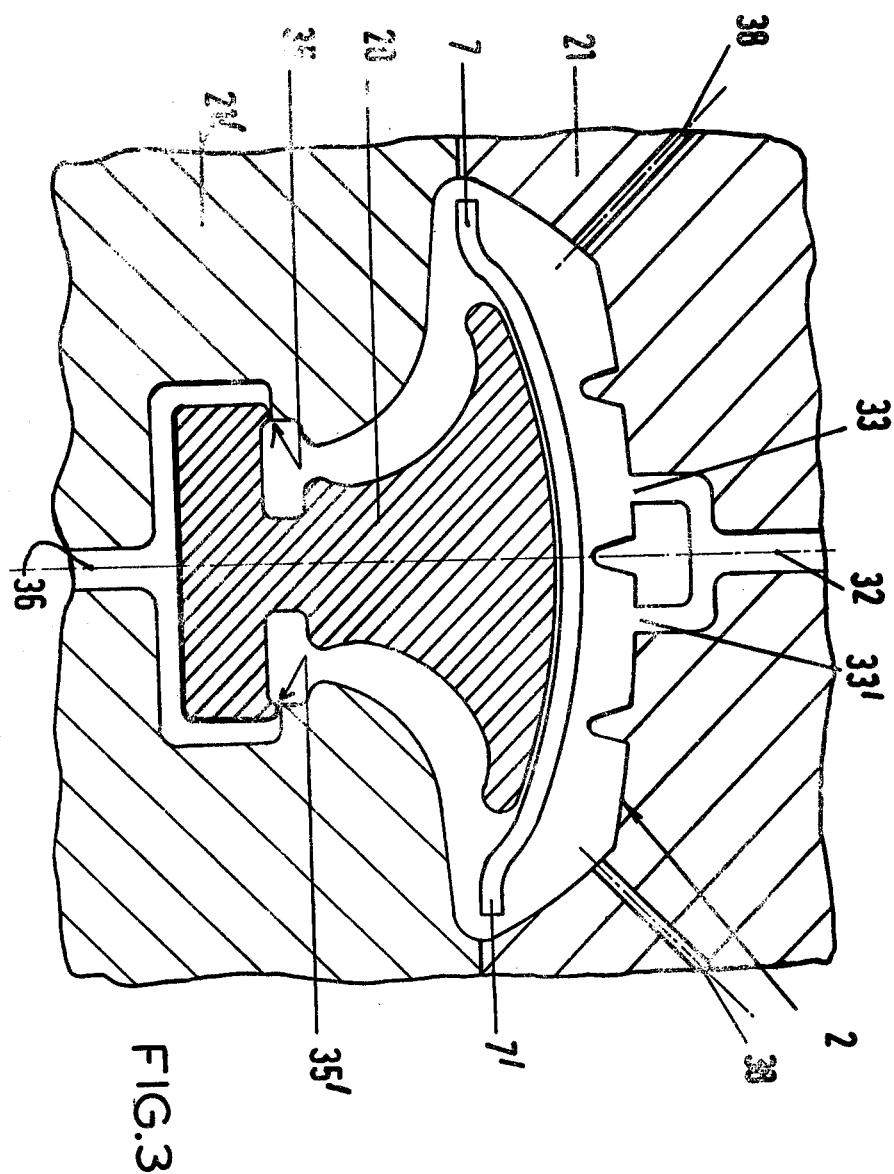
FIG. 3 is a diagrammatic section, taken in a radial plane, of a mold and relative core for molding the tire of FIGS. 1 and 2; hp

FIG. 3 represents diagrammatically the section of a mold in a radial plane.

Figure 4:
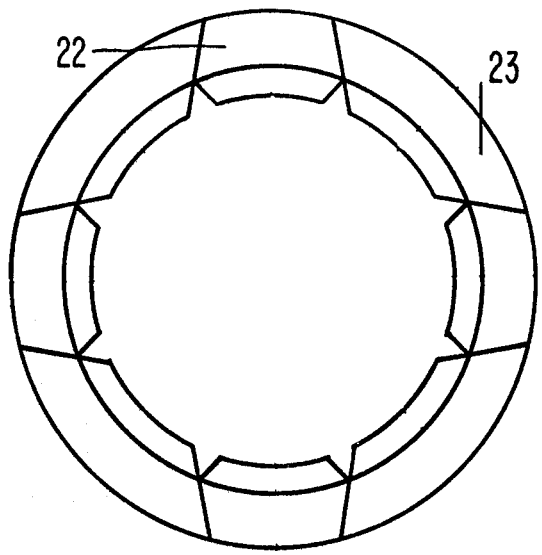
FIG. 4 illustrates the core of FIG. 3, seen in the direction of the tire axis to show a type of segmental construction of the core.

The core 20 is schematically illustrated as if it were a rigid solid element; generally it is circumferentially divided into segments 22 and 23 (see FIG. 4). The female element is illustrated as constituted by a plurality of outer pieces 21 and inner pieces 21'. The reinforcing structure 2 is placed in position in the mold; it is supported in its central part by the core 20, but it is unsupported at its extreme portions 7-7'.

FIG. 3 shows the zones for the injection of the tread compound. The compound enters at 32 at the median plane of the mold, and separates into two distinct streams in the illustrated example which enter in the mold through openings 33, 33' symmetrically with respect to the plane.

The openings 33, 33' have substantially the shape of rings having as axis the axis of the mold; however, it is not necessary for the rings to be completely opened, since they can be closed in correspondence of arcs, alternated with open arcs, provided that their closed portions are not so large as to affect negatively the desired symmetry of the flow. More than two annular openings distributed with the same symmetry can be used and the admission of the compound to them can be carried out in a manner other than that illustrated without departing from the scope of the invention. In establishing the correct mode for the admission of the compound, the shape of the tread, and in particular the number and position of the grooves 34 (FIG. 1) and of the projections interposed between them shall have to be taken into account.

FIG. 3 shows also the substantially annular openings 35–35' for the injection of the compound for the sidewalls which is admitted at 36. By injecting as illustrated, through circular slits situated at the ends of the beads, the compound flows in directions severely contained in radial planes. In practice, it is not necessary to carry out the injection in this way, and instead of circular openings, slits constituted by arcs of a circle separated by blind zones can be foreseen, provided that the injection uniformity reaches a sufficient degree. Also, the position of the indicated injection openings can be varied without departing from the scope of the invention. In particular, the injection of the compound in the sidewalls can be carried out for instance not in the beads but in an intermediate point. In that case, if the resistance which contrasts the flow of the compound towards the bead is smaller than that which contrasts the flow of the compound towards the tread, and this in relation with the positions selected for the injection openings, the compound would fill at first the zone of the beads and secondly it would flow towards the surface of separation from the tread compound in the same way as if the injection had been carried out in the beads. On the contrary, if the injection point were too near to the reinforcing structure, the compound flow would tend to bend the reinforcing structure towards the tread zone, leaving unfilled some zones adjacent to the beads. Encountering the reinforcing structure, the tread compound would be unable to bring the latter again in the correct position, since the resistance opposed to the flow of the tread compound towards the beads would be excessive.

Before and during the injection of the compound both in the sidewalls and in the tread, it is preferable to place the mold cavity under reduced pressure by means of appropriate suction holes 38. In this way, injection is facilitated and molding defects, due to possible air pockets occurring in some point of the mold cavity, can be avoided.

Figure 5:
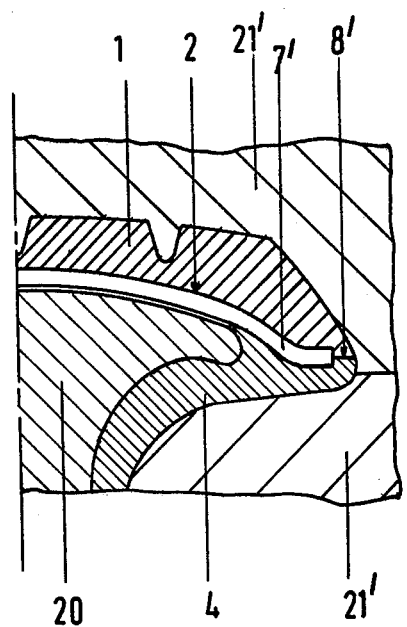
FIG. 5 is an enlarged fragmentary detail showing the zone of contact between the two compounds after the injection operation.

FIG. 5 illustrates the zone of contact of the tread compound and of the sidewalls compound after the injection operation. The reference numerals are those of FIGS. 1 and 3. It is surprising to note that the annular reinforcing structure is in the exact desired position in spite of the fact that it was not supported in any way in positions 7–7'.

It is to be noted that theoretically the compounds would reach the separation zone and would come into contact with the annular reinforcing structure under practically no pressure. In practice, this is not so, because on one hand it would be practically impossible to strictly comply with this condition and, on the other hand, the possible generation of gaseous products would always tend to maintain a sensible pressure, even if small with respect to the high injection pressures, of the order of a few atmospheres. Anyhow, the correct shaping of the molded body and the admission of the compound in the desired zones are not subjected to pressure, as it is usual in injection molding, but are committed to the volumetric control of the compound itself.

By way of example, some parameters regarding a particular injection molding are indicated: hardness of the tread compound 68; hardness of the sidewalls compound 74; measured injection pressure 1,400 atm; molding temperature 170° C (the hardness is expressed in Shore A degrees).

The volumetric dosing of the compounds is carried out for instance by means of piston injectors having an adjustable stroke, as for example that illustrated in U.S. Patent Application Ser. No. 574,393 filed May 5, 1975 by Gallizia, or by other appropriate means supplied with a compound plasticized for instance by a common screw extruder, not illustrated because already known.

The viscosity of the fluid compounds is 14,600 poises for the tread, at 100° C for a shear rate of 300 sec.$^{-1}$ and 12,500 poises for the sidewalls in the same conditions. The injection operation, for a tire having a weight of 6 kg, lasts 37 seconds.

Figure 6A:
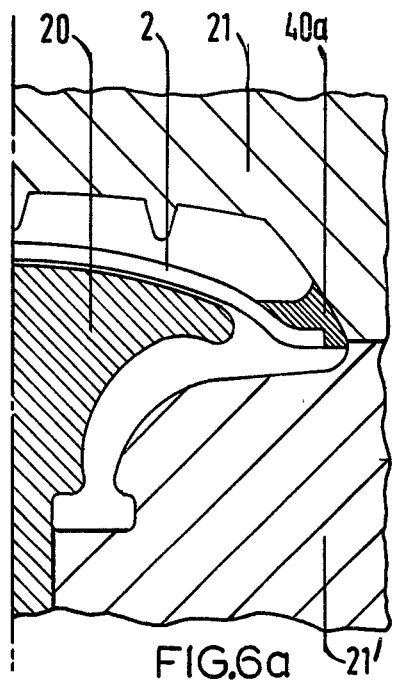
FIGS. 6a and 6b illustrate modified reinforcing structures.
Figure 6B:
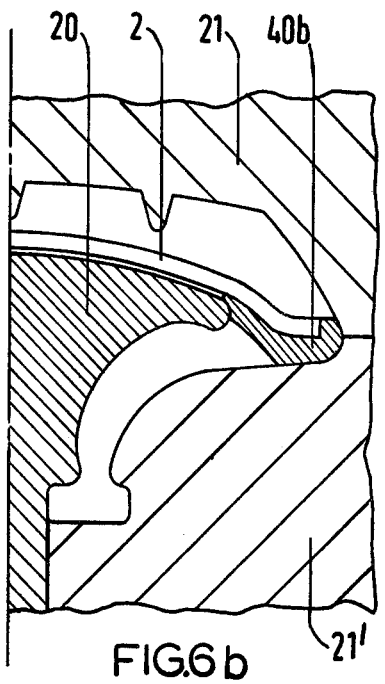
Figure 8:
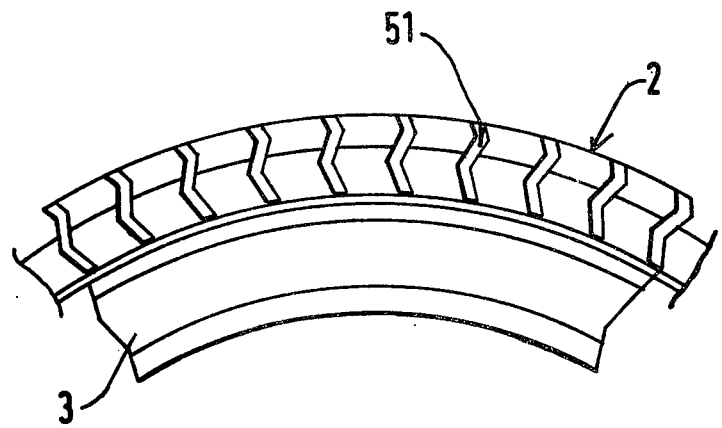
FIG. 8 is a fragmentary lateral view of a tire obtained with the mold of FIG. 7.

FIGS. 6a and 6b show alternative embodiments of the reinforcing structure for carrying out the invention in which the reinforcing structure is provided with projections 40a or 40b of elastomeric material, and preferably of the same material to which they will be joined. The projections 40a (FIG. 6a) are directed towards the outer part of the tire, and therefore will then be incorporated in the tread, while the projections 40b are directed towards its inner part and will then be incorporated in the sidewalls.

Figure 7:
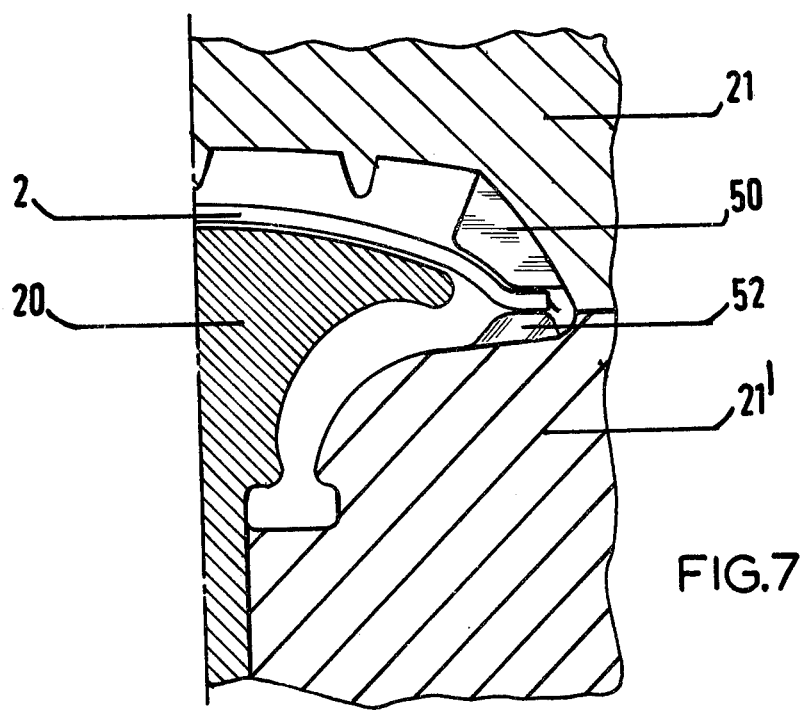
FIG. 7 illustrates in section, in a radial plane, a detail of a modified mold for making a modified embodiment of the invention.

According to a further alternative embodiment of the invention, a pneumatic tire is obtained, in which the separation surfaces between the compound of the sidewalls and the tread compound are positioned as indicated with 9,9' in FIG. 2. For this purpose, the process remains unvaried in its essential lines. The compounds are injected in the amounts volumetrically corresponding to the spaces which are to be occupied. On the other hand, as the sidewall compound has to fill the spaces between the lateral ends of the annular reinforcing structure and the lateral ends of the tire and has to turn about the annular structure to fill a part of the space above it (namely the whole space indicated in FIG. 2 with reference numerals 11–11'), it is necessary to support in some way the annular reinforcing structure 2 to prevent it from being bent backward, i.e., towards the outside, by the flow of the compound of the sidewalls. To this end, as illustrated in FIG. 7, the upper part of the mold is provided with thin lamels 50 having a generally radial path. The lamels 50 are thin and spaced from one another, in order to leave in the tread the prints indicated with 51 in FIG. 8, and have any suitable shape, for instance a zig-zag shape in the illustrated embodiment. The lamels 50 are sufficient to prevent a bending of the annular reinforcing structure, towards the outside, but allow the passage of the sidewalls compound, which fills the whole space as far as the surface of separation from the tread compound. The surface can be situated beyond the lamels 50 to permit joining over the maximum possible area, or can coincide with the ends of the lamels 50, or else can be situated in the zone occupied by the lamels 50.

On the contrary, if it is desired to position the separation surface between the the two compounds in the sidewall zone, radially inside the annular reinforcing structure, as indicated with 10-10' in FIG. 2, the lamels should be arranged inside the annular structure in the sidewall zone. This is illustrated in FIG. 7, where the lamels are indicated with the reference numeral 52, and do not require a detailed description, corresponding exactly to the lamels 50.

The lamels 50 and 52 can be provided and used together, as shown in FIG. 7. The lamels can also have an extension greater than that illustrated (axial extension for lamels 50 and radial extension for lamels 52); lamels 50 can even extend over the whole perimeter of the tread. Although the embodiment of the invention has been described essentially with reference to the shifting of the separation surface between the two compounds above or below the reinforcing structure, it can be however applicable to the manufacture of a tire like that shown in FIG. 1, with the separation line situated on the ideal prolongation of the annular reinforcing structure. In general, the practical embodiment of the process in respect of any tire can be associated with the provision of supporting elements of any kind for an annular reinforcing structure; also in that case, even if the process is always carried out in a single mold, the two compounds should be injected at different times.

The invention has been described with the aid of examples given by way of illustration, with particular reference to a special type of tire; however, it can be subjected to many variations and modifications, as will be clear to one skilled in this field, without departing from its inventive concept.

We claim:

1. A process for the manufacture of tires comprising a crown made of a first compound and including an annular reinforcing structure and sidewalls made of a second compound, including the steps of preparing the reinforcing structure, introducing the same into a mold defining the desired final shape of the complete tire, injecting separately but substantially simultaneously the first compound and the second compound into the mold to fill the free space in said mold so that said first and second compounds flow the one towards the other at least in the delimiting zone between the crown and each sidewall, controlling the relative volumes of the said first and second compounds so injected into the mold to define the delimiting surface between the crown and each sidewall.

2. A process as in claim 1, in which the annular reinforcing structure is prepared by associating one or more reinforcing layers, comprising textile or metallic material and elastomeric material, with one or more outer layers of elastomeric material, and by curing the elastomeric material of the reinforcing layers in a substantially complete manner and the material of the outer layers only in a partial manner.

3. A process as in claim 1, in which the annular reinforcing structure is provided with projections of elastomeric material.

4. A process as in claim 1, comprising supporting the annular reinforcing structure in fixed position in the mold, along at least a significant portion of one of its faces.

5. A process as in claim 1, in which, after the injection operation, the tire is cured, and then the core is extracted and the tire is removed from the female part of the mold.

6. A process for making a vehicle tire having beads, sidewalls, crown, and a crown-reinforcing member, which comprises:
   providing two mold cavities having surfaces respectively defining the crown portion and the sidewalls and beads portion of the tire, except at the junction of the crown to the sidewalls, said mold cavities communicating in correspondence to said junction;
   disposing an annular reinforcing member for the crown having laterally spaced edges in the first of said cavities defining the crown portion of the tire;
   injecting a measured volume of a first compound into said first cavity; and
   separately and substantially simultaneously injecting a measufed volume of a second compound which is different from the first compound, into the second of said cavities, defining the sidewalls and beads portion of the tire;
   the ratio of said two measured volumes determining the surface at which the junction of the crown to the sidewalls is formed.

7. A process according to claim 6, comprising placing the mold cavities under reduced pressure prior to injecting the compounds, and maintaining said reduced pressure during the injection thereof.

8. A process according to claim 6, in which the two compounds are injected into opposite zones of the mold cavities, said zones being positioned symmetrically with respect to the median plane of the mold cavities.

9. A process as in claim 8, in which the injection zones of the crown compound in the mold are constituted by annular openings with an axis coincident with the mold axis and situated on the outer surface of the crown zone.

10. A process as in claim 8, in which the injection zones of the sidewalls compound in the mold are constituted by annular openings with an axis coincident with the mold axis situated adjacent the bead zones.

11. Apparatus for carrying out the process according to claim 1, comprising a composite collapsible rigid core defining the inner surfaces of the tire, at least one female element defining the outer surface of the crown including the tread and provided with openings for the introduction of a tread compound, at least two female elements defining the outer surfaces of the sidewalls and beads and provided with openings for the introduction of a sidewall compound, and means for separately and substantially concurrently feeding to said openings said two compounds, in the fluid state and in separately dosed volumetric amounts.

12. An apparatus as defined in claim 11, in which the core is so shaped on its annular outer surface as to provide a support for a substantial part of the inner face of the tire reinforcing structure, but not to said whole face.

13. An apparatus as defined in claim 12, in which the female element is provided with inner projections providing additional support for the annular reinforcing structure on at least one face thereof, said projections being such as to allow the flow of the compounds between them.

14. An apparatus as in claim 11, in which the injection openings have an annular shape, with an axis coincident with the axis of the mold, are symmetrical with respect to the median plane of the latter, and are situated, for injection of the crown compound, on the outer surface of the tread zone, and for injection of the sidewall compound in proximity to the bead zone, each of said openings being connected to its own channel for the supply of the respective compound.

15. An apparatus according to claim 11, comprising openings for placing the mold under reduced pressure.

* * * * *